(12) United States Patent
Makino et al.

(10) Patent No.: US 9,576,456 B2
(45) Date of Patent: Feb. 21, 2017

(54) SOLAR BATTERY-DRIVEN OBJECT DETECTION SYSTEM

(71) Applicant: OPTEX CO., LTD., Shiga (JP)

(72) Inventors: Hiroshi Makino, Otsu (JP); Koji Hayashide, Otsu (JP); Mataichi Kurata, Otsu (JP); Hiroyuki Ikeda, Otsu (JP)

(73) Assignee: OPTEX CO., LTD., Shiga (JP)

( * ) Notice: Subject to any disclaimer, the term of this patent is extended or adjusted under 35 U.S.C. 154(b) by 192 days.

(21) Appl. No.: 14/222,426

(22) Filed: Mar. 21, 2014

(65) Prior Publication Data

US 2014/0285342 A1 Sep. 25, 2014

(30) Foreign Application Priority Data

Mar. 21, 2013 (JP) .................................. 2013-058050

(51) Int. Cl.
| | |
|---|---|
| G08B 13/16 | (2006.01) |
| G08B 1/08 | (2006.01) |
| G08B 21/00 | (2006.01) |
| G08B 13/24 | (2006.01) |
| H01L 31/048 | (2014.01) |
| H02S 20/30 | (2014.01) |
| H02S 40/38 | (2014.01) |
| H02S 10/20 | (2014.01) |
| G01V 8/10 | (2006.01) |

(52) U.S. Cl.
CPC ............ G08B 13/2491 (2013.01); G01V 8/10 (2013.01); H01L 31/048 (2013.01); H02S 10/20 (2014.12); H02S 20/30 (2014.12); H02S 40/38 (2014.12); Y02E 10/50 (2013.01)

(58) Field of Classification Search
CPC ....... G08B 13/183; G08B 13/19; G08B 13/00; G08B 13/191; G08B 17/12; G01J 5/0022; G01J 5/0025; G01J 5/025; Y02B 20/44
USPC .................................. 340/556, 539.3, 636.1
See application file for complete search history.

(56) References Cited

U.S. PATENT DOCUMENTS

| | | | | |
|---|---|---|---|---|
| 3,619,612 A | * | 11/1971 | Belke ...................... | G08C 23/04 250/214 SG |
| 4,882,567 A | * | 11/1989 | Johnson ................. | G08B 13/19 340/522 |
| 4,982,176 A | * | 1/1991 | Schwarz ....................... | 340/567 |
| 5,552,767 A | * | 9/1996 | Toman ................... | G08B 5/006 340/331 |

(Continued)

FOREIGN PATENT DOCUMENTS

JP 09-161157 A 6/1997

*Primary Examiner* — Emily C Terrell
(74) *Attorney, Agent, or Firm* — Studebaker & Brackett PC

(57) ABSTRACT

A reception unit 2 of a detection unit 3 includes a transmitter 30 that transmits a reception (detection) level of an infrared beam to a transmission unit 1, and a demand signal output unit 26 that transmits to the transmission unit 1 a demand signal M, demanding to control the intensity of the infrared beam to be transmitted so that the reception level matches a predetermined value. The transmission unit 1 includes an infrared ray (detection beam) intensity control unit 15 that controls, upon receipt of the demand signal M, the intensity of the infrared beam to be transmitted so that the reception level matches the predetermined value. A power source unit 31 is a solar battery unit including a solar panel and a charging medium that stores power from the solar panel.

3 Claims, 5 Drawing Sheets

(56) References Cited

U.S. PATENT DOCUMENTS

| | | | |
|---|---|---|---|
| 6,118,375 A * | 9/2000 | Duncan | 340/541 |
| 7,973,273 B2 * | 7/2011 | Hoermann | 250/221 |
| 2007/0205904 A1 * | 9/2007 | Froehner | A01M 31/002 340/573.2 |
| 2008/0074259 A1 * | 3/2008 | Houston | 340/556 |
| 2008/0136914 A1 * | 6/2008 | Carlson | G08B 7/06 348/155 |
| 2009/0140848 A1 * | 6/2009 | Rollins | G08B 13/00 340/521 |
| 2010/0141444 A1 * | 6/2010 | Brown et al. | 340/555 |
| 2010/0148989 A1 * | 6/2010 | Hawkins | E01F 9/617 340/944 |
| 2010/0194564 A1 * | 8/2010 | DiPoala | 340/556 |

* cited by examiner

SOLAR BATTERY-DRIVEN OBJECT DETECTION SYSTEM

CROSS REFERENCE TO THE RELATED APPLICATION

This application is based on and claims Convention priority to Japanese patent application No. 2013-058050, filed on Mar. 21, 2013, the entire disclosure of which is herein incorporated by reference as a part of this application.

BACKGROUND OF THE INVENTION

Field of the Invention

The present invention relates to a solar battery-driven object detection system, in which a detection unit having a transmission unit and a reception unit is driven by the solar battery unit, the reception unit constantly receives detection beams transmitted from the transmission unit, and thereby detection of an object when the object intercepts the detection beams is achieved.

Description of Related Art

Object detection systems are thus far known that include a detection unit having a transmission unit such as a light projecting unit and a reception unit such as a light receiving unit which are arranged so as to oppose each other across a detection region, in which the light receiving unit constantly receives detection beams, for example infrared rays (IR), projected from the light projecting unit, to thereby detect an object when the object intercepts the infrared rays in the detection region. Such an object detection system is employed, for example, in a security sensor that outputs an alarm upon detecting an object.

In recent years, battery-driven object detection systems configured to supply power to the detection unit from a battery have come to be widely utilized, for purposes such as reducing power consumption and saving wiring works. Some of such object detection systems employ, for example, a solar battery unit including a solar panel for generating power using sunlight and a secondary battery for storing the power as disclosed in, for example, Japanese Laid-open Patent Publication No. 9-161157.

With the conventional solar battery-driven object detection system, however, the intensity of the detection beam has to be increased in order to extend the detection distance, and therefore a battery having a larger capacity has to be employed to cover the increase in power consumption, which leads to an increase in size of the solar panel to be incorporated. The increase in size of the system naturally results in an increase in cost. Meanwhile, with the solar panel of a reduced size, a sufficient battery capacity is unable to be secured and therefore the power consumption is limited, which makes it difficult to perform long distance detection since the detection distance is shortened.

SUMMARY OF THE INVENTION

Accordingly, an object of the present invention is to provide a solar battery-driven object detection system capable of performing long distance detection (warning) while solving the above problems and avoiding an increase in battery capacity and generation capacity of the solar panel.

In order to attain the above object, in an aspect, the present invention provides a solar battery-driven object detection system including a detection unit having a transmission unit that transmits a detection beam to a detection region and a reception unit that constantly receives the detection beam transmitted from the transmission unit and detects an object when the object intercepts the detection beam in the detection region, and a power source unit that supplies power to the detection unit. The reception unit includes a transmitter that transmits a reception level of the detection beam to the transmission unit, and a demand signal output unit that transmits to the transmission unit a demand signal to control intensity of the detection beam to be transmitted so that the reception level matches a predetermined value. The transmission unit includes a detection beam intensity control unit that controls, upon receipt of the demand signal, the intensity of the detection beam to be transmitted so that the reception level matches the predetermined value. The power source unit is a solar battery unit including a solar panel and a charging medium that stores power from the solar panel.

In the system thus configured, the transmission unit controls the intensity of the detection beam to be transmitted so that the reception level matches the predetermined value, upon receipt, from the reception unit, of the demand signal for controlling the intensity of the detection beam to be transmitted. With the above-described configuration, the intensity can be increased, for example in an adverse environment such as temporary fog or rain, in which the intensity of the transmitted detection beam is attenuated and the reception level declines, whereas generally in a normal environment corresponding to most of the time, in which the intensity of the transmitted detection beam is not attenuated, the intensity of the detection beam to be transmitted can be maintained at a lower level. Thus, the power consumption of the power source unit can be reduced as a whole. Further, since the power source unit is a solar battery unit including a solar panel and a charging medium that stores the power from the solar panel, the above-described reduction in power consumption allows the battery capacity to be reduced by incorporating a smaller-sized solar panel, and therefore the solar battery unit of a reduced size can be attained. In this way, the object detection system is capable of performing long distance detection with the battery capacity and the generation capacity of the solar panel maintained reduced. In other words, a smaller solar battery unit may be employed, provided that the required detection distance is the same.

Preferably, a manual intensity operation unit for manually controlling the intensity of the detection beam to be transmitted may be provided for the demand signal output unit. In this case, the intensity of the detection beam to be transmitted can be easily set manually, according to the detection distance.

In another aspect, the present invention provides a security sensor including the solar battery-driven object detection system, and configured to output an alarm upon detecting an object. This configuration facilitates the power source to be secured outdoors, and allows long distance detection (warning) to be performed with the battery capacity and the generation capacity of the solar panel maintained reduced. In addition, a smaller solar battery unit may be employed, provided that the required detection distance is the same.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
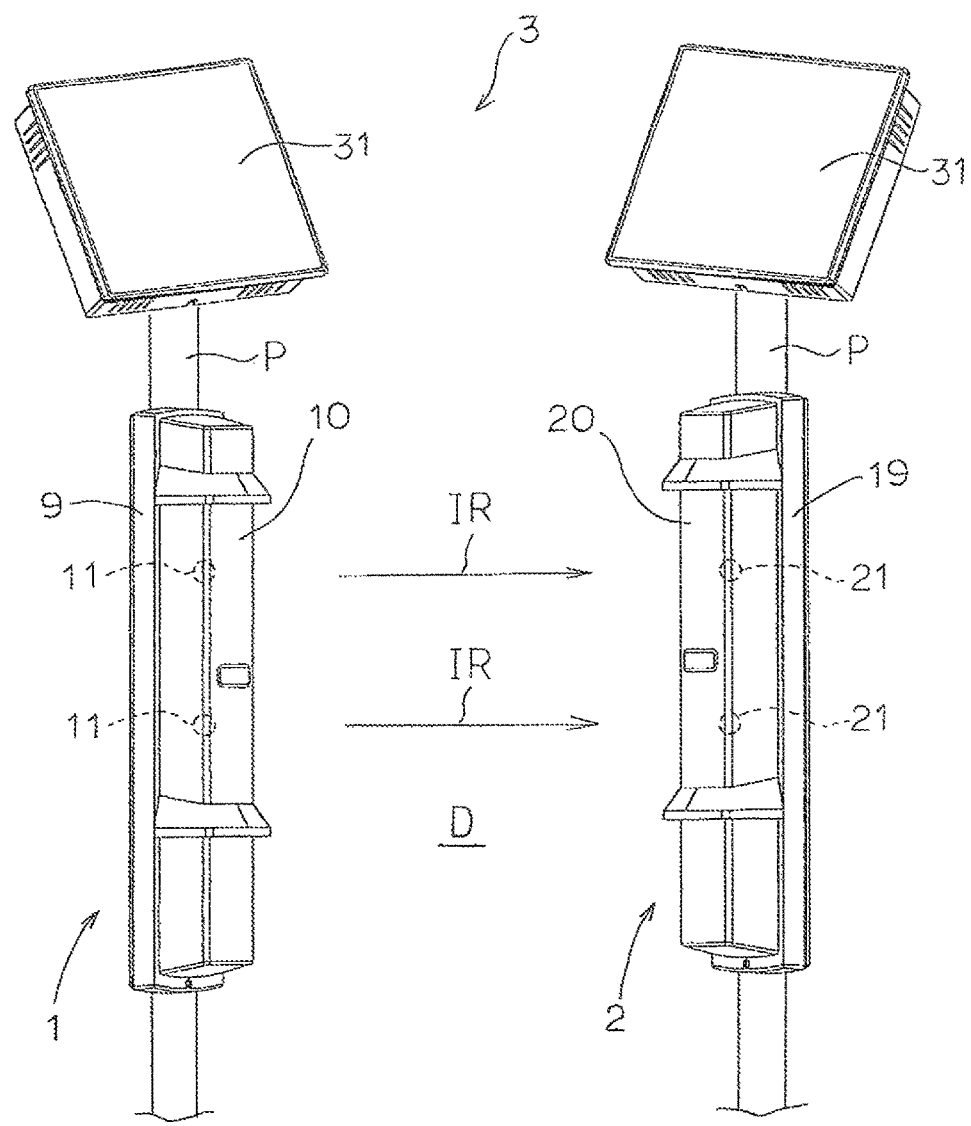
FIG. 1 is a perspective view showing a solar battery-driven object detection system according to an embodiment of the present invention.

Hereafter, an embodiment of the present invention will be described with reference to the drawings. FIG. 1 is a perspective view showing a solar battery-driven object detection system according to an embodiment of the present invention. As shown in FIG. 1, the object detection system includes a detection unit 3 having a transmission unit 1 such as a light projecting unit that projects a detection beam such as infrared rays IR to a detection (warning) region D, and a reception unit 2 such as a light receiving unit that receives the projected infrared rays IR so as to detect an object when the object intercepts the infrared rays in the detection region D, and a solar battery unit 31 serving as the power source unit that supplies power to the detection unit 3. In this embodiment, the detection unit 3 is of an active infrared ray (AIR) type, and the object detection system is intended for use in a security sensor installed outdoors and configured to output an alarm signal upon detecting an object.

The light projecting unit 1 includes a base 9 attached to a mounting position of a pole P or a wall, and a cover 10 that covers the base 9, and likewise the light receiving unit 2 includes a base 19 and a cover 20 that covers the base 19.

Figure 2:
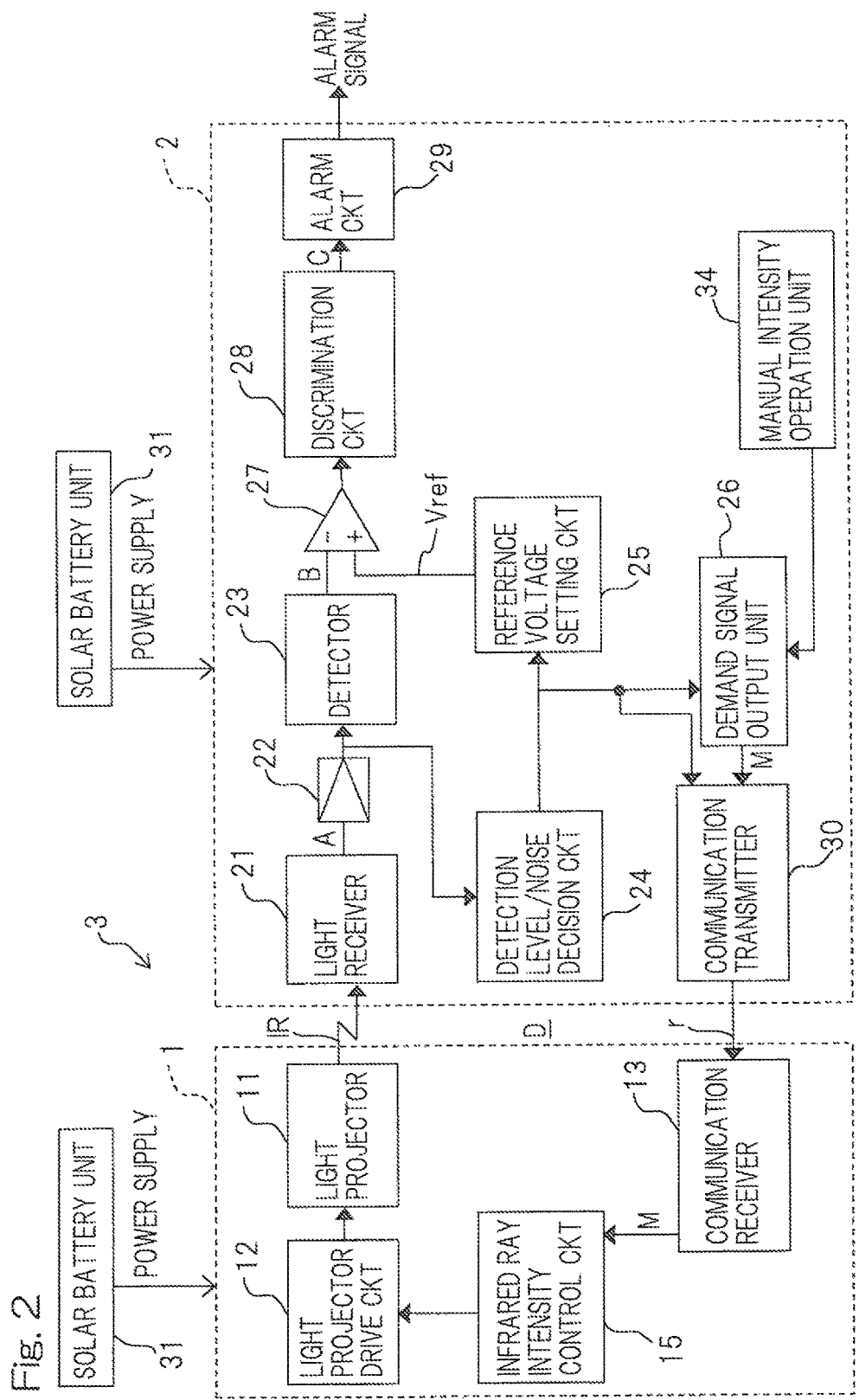
FIG. 2 is a block diagram showing a circuit configuration of the system according to the embodiment.

FIG. 2 is a block diagram showing a configuration of the solar battery-driven object detection system according to this embodiment. In the light projecting unit 1, a light projector 11 includes a light projecting element such as an infrared emitting diode (not shown), and a projecting-side optical system including a light projecting lens or a reflecting mirror (not shown) for forming infrared rays IR to be projected. The light projecting element is driven by a light projector drive circuit 12 to emit light at a predetermined frequency, and projects the infrared rays IR composed of pulse-modulated light through the cover 10 (see FIG. 1) covering the front face of the light projector 11. In this embodiment, the light projector 11 includes a pair of light projecting element and projecting-side optical system arranged one above the other, and the light receiver 21 also includes a pair of light receiving element and receiving-side optical system arranged one above the other.

The light projecting unit 1 further includes a communication receiver 13 that receives a detection level signal (described below) through radio signals r, and an infrared ray (detection beam) intensity control unit (infrared ray intensity control circuit) 15 that controls the light projector drive circuit 12 to automatically control the intensity (light projecting power) of the infrared rays projected from the light projector 11 so that the detection level matches a predetermined value. The infrared ray intensity control unit 15 is also adapted for manual adjustment of the light projecting power. Circuit elements, i.e., the light projector 11, the light projector drive circuit 12, the communication receiver 13 and the infrared ray intensity control unit 15 are mounted on the base 9 shown in FIG. 1, and covered with the cover 10.

In the light receiving unit 2 shown in FIG. 2, a light receiver 21 includes the receiving-side optical system including a light receiving lens or a light collecting mirror (not shown), and a light receiving element such as a photodiode (not shown). The light receiving element receives the infrared rays IR reaching through the cover 20 (see FIG. 1) covering the front face of the light receiving unit 2, and outputs a light amount signal A based on the amount of the received light.

The light amount signal A is amplified by an amplifier 22 and inputted to a detector 23, and a signal B is outputted corresponding to a level of the pulse-modulated light from which a stray light component has been removed. The light amount signal A is also inputted to a detection level/noise decision circuit 24 for decision of whether the signal is at a detection level or a noise, and the signal decided as being at the detection level is inputted to a reference voltage setting circuit 25. The output signal B from the detector 23 is compared by a comparator 27 with a reference voltage Vref determined by the reference voltage setting circuit 25, and only a component of the signal B that is of a higher level than the reference voltage Vref is outputted to a discrimination circuit 28. The discrimination circuit 28 discriminates whether the signal B is equal to or lower than a predetermined intruder detection level and outputs a detection signal C to an alarm circuit 29 when the signal B is equal to or lower than the detection level, so that the alarm circuit 29 outputs an alarm signal notifying that there is an intruder in the detection (warning) region D.

The light receiving unit 2 further includes a demand signal output unit 26 that transmits, to the light projecting unit 1 through a communication transmitter 30, a demand signal M for controlling the intensity of the infrared rays to be transmitted so that the detection level detected by the detection level/noise decision circuit 24 matches the predetermined value. The communication transmitter 30 transmits the demand signal M and the detection level to the receiver 13 by radio signals r. The light projecting unit 1 causes the infrared ray intensity control unit 15 to drive the light projector drive circuit 12, upon receipt of the demand signal M, which demands an increase of the intensity of the infrared rays to be projected, from the light receiving unit 2 at the communication receiver 13, to thereby increase the intensity of the infrared rays to be projected so that the detection level matches the predetermined value.

Circuit elements, i.e., the light receiver 21, the amplifier 22, the detector 23, the detection level/noise decision circuit 24, the reference voltage setting circuit 25, the demand signal output unit 26, the comparator 27, the discrimination circuit 28, the alarm circuit 29 and the communication transmitter 30 are mounted on the base 19 shown in FIG. 1, and covered with the cover 20.

Generally, the detection sensitivity of object detection systems is set with a certain allowance, to maintain the detection capability even under an adverse condition of the location where the system is installed. The infrared ray intensity control unit 15 controls, i.e., increases or decreases the intensity of the infrared rays to be projected, so as to maintain the sensitivity allowance at a constant level. For example, the infrared ray intensity control unit 15 increases the intensity of the infrared rays to be projected in an adverse environment such as a foggy or rainy weather, in order to maintain the detecting capability taking the attenuation of the projected infrared rays into account. On the other hand, in the normal environment in which the projected infrared rays are kept from being attenuated, the detection can be performed with a lower intensity of the infrared rays. The above-described arrangement is based on the fact that, generally, during the detection operation, the adverse environment is only temporary and ends in a short time in most of the cases, whereas the environment remains normal through most of the time. Therefore in the adverse environment the demand signal output unit 26 in the light receiving unit 2 transmits to the light projecting unit 1 the demand signal for increasing the intensity of the infrared rays to be projected, so that the infrared ray intensity control unit 15 in the light projecting unit 1 temporarily increases the intensity of the infrared rays to be projected, whereas during most of the time in the normal environment, the intensity of the infrared rays is maintained at a lower level to thereby optimize the detection sensitivity according to the environmental conditions.

Further, the intensity of the infrared rays (detection beam) to be projected can be manually controlled and set through the demand signal output unit 26, by using a manual intensity operation unit 34 shown in FIG. 2. The manual intensity operation unit 34 is configured to allow manual setting of the intensity, for example at three levels namely high (H), medium (M), and low (L), according to the detection distance, and such a demand signal is transmitted to the light projecting unit 1 through the communication transmitter 30. For example, when the detection distance is short, the intensity of low (L) is manually set. Thus, the intensity of the infrared rays to be projected can be easily set manually according to the detection distance. It should be noted that the manual intensity operation unit 34 may be excluded if not necessary.

Figure 3:
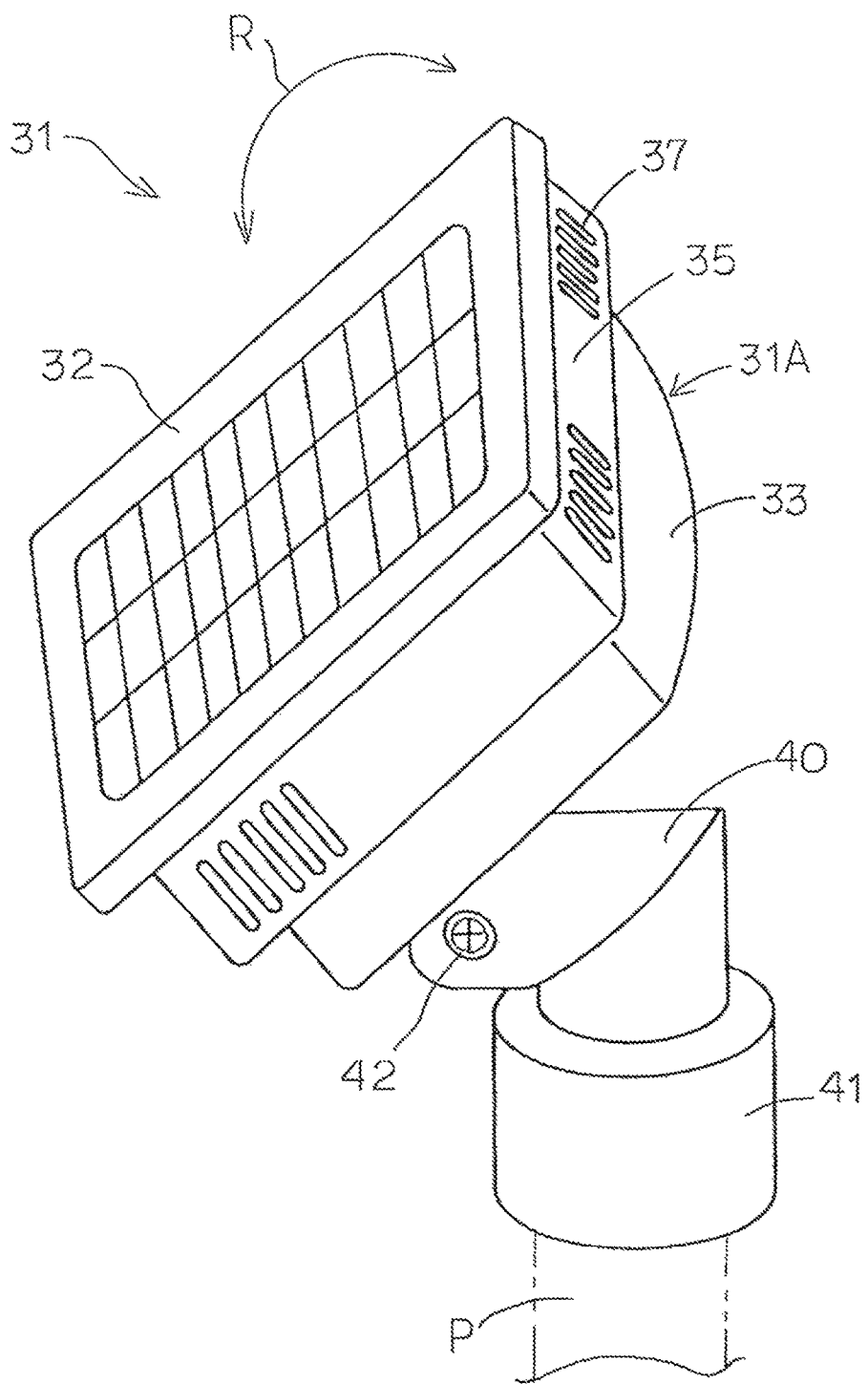
FIG. 3 is a perspective view showing the solar battery unit, serving as the power source of the system.
Figure 4:
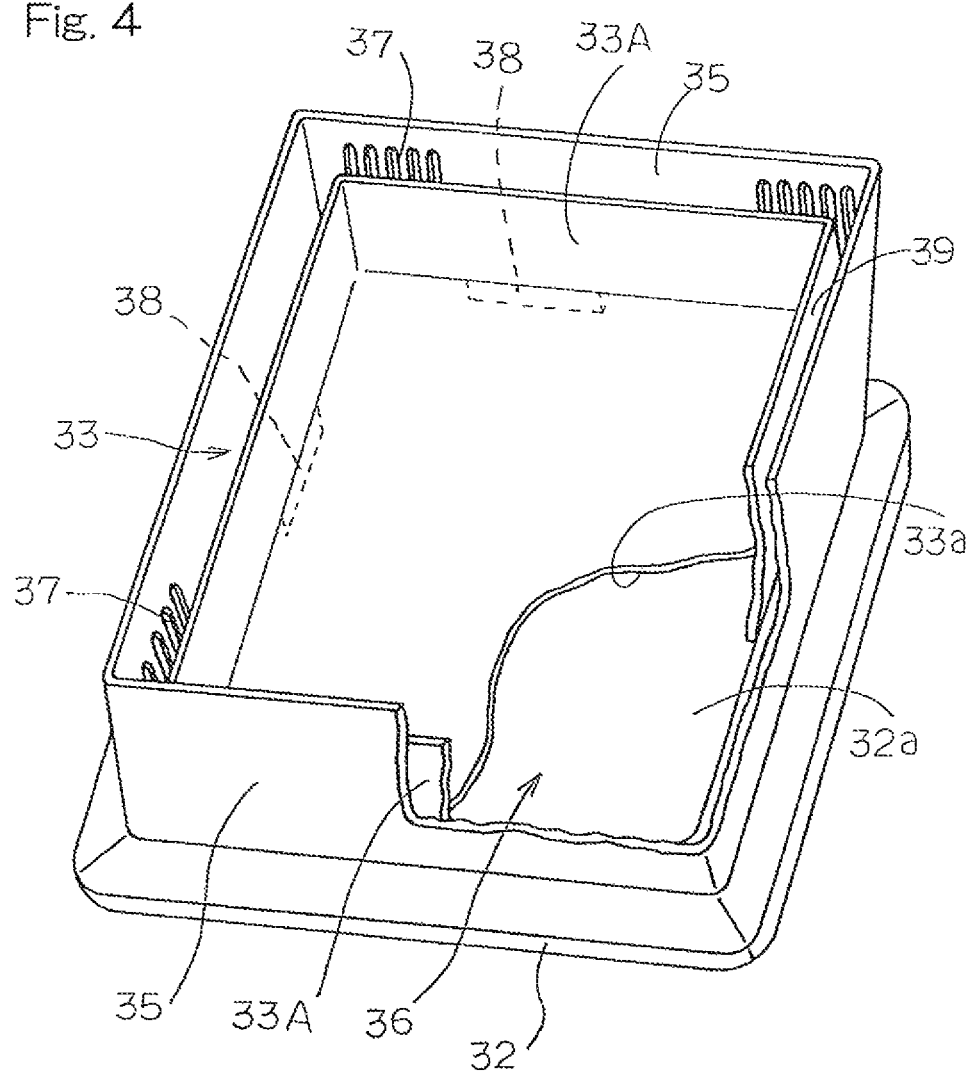
FIG. 4 is a partially broken exploded perspective view showing the solar battery unit.
Figure 5:
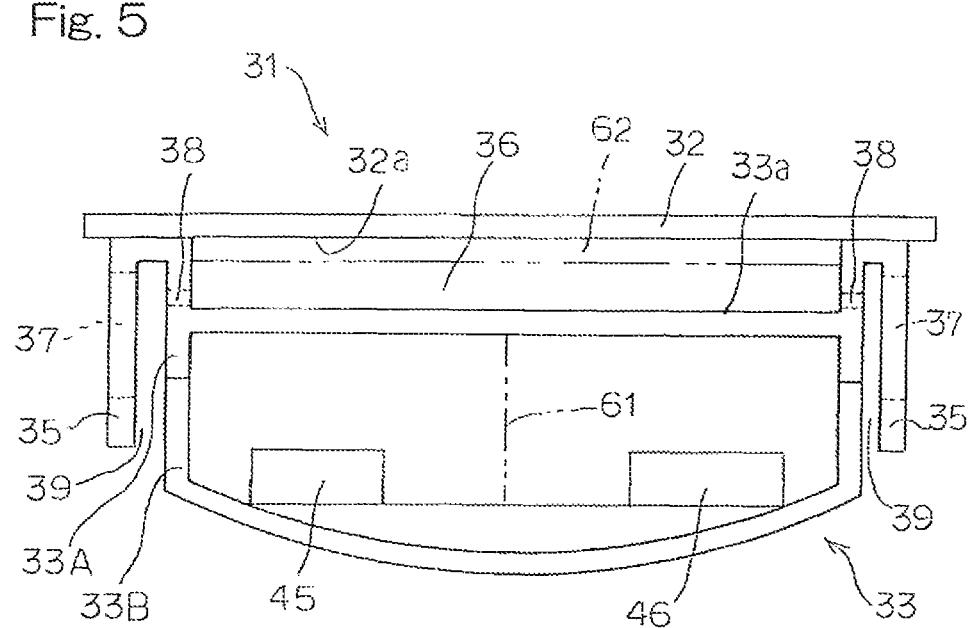
FIG. 5 is a side view showing the solar battery unit.

The solar battery unit including a solar panel and a charging medium such as a secondary battery that stores the power from the solar panel is employed as the power source unit that supplies power to the detection unit 3. The charging medium includes a capacitor. FIG. 3 is a perspective view showing the solar battery unit 31 according to this embodiment. FIG. 4 is a partially broken exploded perspective view showing the solar battery unit 31 shown in FIG. 3, seen from the rear side. FIG. 5 is a side view of the solar battery unit 31 shown in FIG. 3. The solar battery unit 31 shown in FIG. 3 is mounted with a mounting base 41 to the upper end portion of the pole P to which the detection unit 3 shown in FIG. 1 is attached.

The solar battery unit 31 shown in FIG. 3 includes a solar panel 32, and a main body 31A including a main body housing 33 and an outer wall 35 covering the outer periphery of the main body housing 33. As shown in FIG. 5, the main body housing 33 has a box-like shape, and includes an upper half housing 33A having an upper face 33a and a lower half housing 33B having a bottom face 33b. The lower half housing 33B stores therein a secondary battery 45 that stores, for example, DC power from the solar panel 32 and a control circuit (control board) 46 that controls the overall operation of the solar battery unit 31. The secondary battery 45 is, for example, constituted of a lithium ion battery. A plurality of ventilation holes 38 are provided between the bottom face 32a of the solar panel 32 and the upper face 33a of the main body housing 33, so as to allow insertion between an outer region of the main body housing 33 and a space 36 to be described below.

Wall faces of the outer wall 35 serve to shield light from reaching the main body housing 33, to thereby suppress an increase in temperature inside the main body housing 33. Accordingly, the life of the secondary battery 45 can be prolonged in a state of low temperature. In addition, since the wall faces of the outer wall 35 cover the outer periphery of the main body housing 33, the outer wall 35 can also serve to improve the waterproofness and insect-repellent effect with respect to the inside of the main body housing 33.

The space 36 is defined between the bottom face 32a of the solar panel 32 and the upper face 33a of the main body housing 33. The space 36 serves to insulate the main body housing 33 from heat generated by the solar panel 32. In addition, the plurality of ventilation holes 38 are provided between the bottom face 32a of the solar panel 32 and the upper face 33a of the main body housing 33. As shown in FIG. 4, the outer wall 35 includes a plurality of ventilation holes 37 formed so as to face the space 36. In this embodiment, the ventilation holes 37 are provided on four sides of the outer wall 35, so as to facilitate air convection in the space 36. With the ventilation holes 37, the ambient air is introduced and flows into the space 36 through the ventilation holes 38 to ventilate the space, and thereby the heat insulation effect improves.

The outer wall 35 is fixed to the bottom face 32a of the solar panel 32, and a gap 39 defined between the side face of the main body housing 33 and the outer wall 35 has an opening oriented downward. The gap 39 allows air convection from a region below the gap 39 upward to the space 36 and the ventilation holes 37 of the outer wall 35, thereby enhancing the suppressing effect of the temperature increase inside the main body housing 33.

The solar battery unit 31 shown in FIG. 3 further includes a support portion 40 that supports the main body 31A so as to pivot in a direction indicated by R in FIG. 3, and the mounting base 41 via which the solar battery unit 31 is mounted on the pole P. The main body 31A is pivotable, in the direction indicated by R, about a screw 42 of the support portion 40 serving as the pivotal axis, and therefore the angle of the surface of the solar panel 32 can be adjusted as desired.

Although the internal space in the main body housing 33 is not partitioned in this embodiment as shown in FIG. 5, the internal space may be divided into a plurality of sections for individually accommodating electronic devices such as the secondary battery 45 and the control circuit 46. For example, division with a partition plate 61 (as indicated by chain double-dashed lines) allows each of the secondary battery 45 and the control circuit 46 to be more effectively insulated from heat, thereby further improving the heat insulation effect of the main body housing 33.

A heat insulator 62 may be provided (as indicated by chain double-dashed lines) on at least one of either the bottom face 32a of the solar panel 32 and the upper face 33a of the main body housing 33, in the space 36. Such a configuration further improves the heat insulation effect of the main body housing 33. The temperature increase in the main body housing 33, in which the secondary battery 45 for storing the power from the solar panel 32 is located, is effectively suppressed by the improved heat insulation performance, which results in prolonged life of the secondary battery 45.

As described above, in this embodiment, the solar battery unit is employed as the power source unit, and the light projecting unit (transmission unit) increases the intensity of the infrared rays to be projected so that the detection level matches the predetermined value, upon receipt of the demand signal demanding an increase of the intensity of the infrared rays to be projected, from the light receiving unit (reception unit). Accordingly, the intensity can be increased, for example in an adverse environment such as temporary fog or rain, in which the intensity of the projected infrared rays is attenuated and the detection level declines, whereas generally in a normal environment corresponding to most of the time, in which the intensity of the projected infrared rays is not attenuated, the intensity of the infrared rays to be projected can be maintained at a lower level. Thus, the power consumption of the power source unit can be reduced as a whole. Therefore, the object detection system according to this embodiment is capable of performing long distance detection (warning) with the battery capacity and the generation capacity of the solar panel maintained reduced. In other words, a smaller solar battery unit may be employed, provided that the required detection distance is the same. Further, reducing the size of the solar battery unit enables the cost of the object detection system to be reduced.

Although it may be sometimes difficult to secure the driving power source for an object detection system employed in a security sensor installed outdoors, the solar battery unit 31 according to this embodiment can well withstand the use as the driving power source for such an object detection system, because of the excellent heat insulation effect of the solar battery unit 31 and the prolonged life of the secondary battery 45.

The infrared rays are employed as the detection beam in the above-described embodiment, but without limiting thereto. A visible light, a microwave, a laser beam, or the like may be employed instead.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . transmission unit (light projecting unit)
2 . . . reception unit (light receiving unit)
3 . . . detection unit
11 . . . light projector
15 . . . infrared ray intensity control circuit (detection beam intensity control unit)
21 . . . light receiver
26 . . . demand signal output unit
30 . . . communication transmitter
31 . . . power source unit (solar battery unit)
32 . . . solar panel
34 . . . manual intensity operation unit
IR . . . infrared rays (detection beam)
D . . . detection region
M . . . demand signal
r . . . radio signals

What is claimed is:

1. A solar battery-driven object detection system, the system comprising:
   a detection unit having a transmission unit that transmits a detection beam to a detection region and a reception unit that constantly receives the detection beam transmitted from the transmission unit and detects an object when the object intercepts the detection beam in the detection region; and
   a power source unit that supplies power to the detection unit,
   wherein the reception unit includes a transmitter that transmits a reception level of the detection beam to the transmission unit, and a demand signal output unit that transmits to the transmission unit a demand signal for controlling intensity of the detection beam corresponding to an environment to be transmitted so that the reception level matches a predetermined value capable of maintaining a detection capability for the environment,
   the transmission unit includes a detection beam intensity control unit that controls, upon receipt of the demand signal in an adverse environment, so as to increase the intensity of the detection beam to be transmitted so that the reception level matches the predetermined value, but to attenuate the intensity of the detection beam upon receipt of no demand signal, and
   the power source unit is a solar battery unit including a solar panel and a charging medium that stores power from the solar panel.

2. The system according to claim 1, further comprising a manual intensity operation unit that allows the intensity of the detection beam to be transmitted to be manually controlled and set for the demand signal output unit.

3. A security sensor comprising the solar battery-driven object detection system according to claim 1, and configured to output an alarm upon detecting an object.

* * * * *